United States Patent [19]
Maruyama et al.

[11] Patent Number: 4,603,958
[45] Date of Patent: Aug. 5, 1986

[54] AUTOMATIC ELECTRONIC FLASH

[75] Inventors: Yuji Maruyama; Katsumi Horinishi, both of Suita, Japan

[73] Assignee: West Electric Company, Ltd., Osaka, Japan

[21] Appl. No.: 671,126

[22] Filed: Nov. 13, 1984

[30] Foreign Application Priority Data

Nov. 15, 1983 [JP] Japan ................................. 58-215613
Mar. 13, 1984 [JP] Japan ................................. 59-47637

[51] Int. Cl.⁴ .......................................... G03B 15/02
[52] U.S. Cl. ................................. 354/414; 354/127.1; 315/241 P
[58] Field of Search ............... 354/414, 465, 416, 471, 354/417, 474, 423, 475, 429, 432, 145.1, 127.1, 127.11, 127.12; 315/151, 241 P, 133, 134

[56] References Cited

U.S. PATENT DOCUMENTS

| | | | |
|---|---|---|---|
| 4,074,288 | 2/1978 | Johnson et al. | 354/414 |
| 4,174,161 | 11/1979 | Mashimo et al. | 354/414 |
| 4,331,400 | 5/1982 | Brownstein et al. | 354/414 |
| 4,375,322 | 3/1983 | Coppa et al. | 354/414 |
| 4,456,353 | 6/1984 | Mizokami | 354/414 |
| 4,456,354 | 6/1984 | Mizokami | 354/414 |

FOREIGN PATENT DOCUMENTS 56-87028 7/1981 Japan ................................. 354/419

Primary Examiner—William B. Perkey
Attorney, Agent, or Firm—Cushman, Darby & Cushman

[57] ABSTRACT

An automatic electronic flash measures brightness of a predetermined photographing angle including a photographic object, and using the measured brightness and film sensitivity indicates a stop value to be set in camera when the photographic scenery has rear light, and the automatic electronic flash operation is automatically lowered by the extent of F-stop value (automatic F-stop value) of 1-2 EV than the indicated stop value, thereby satisfactory automatic fill-in photographing with the automatic electronic flash can be made; and the automatic electronic flash further comprises means to warn when the brightness of the photographic scenery changes from the measured value, and besides, the above-mentioned controlling corresponding to the automatic F-stop value is examined taking account of the scenery brightness and film sensitivity and produce another warning when automatic F-stop value is an impractical value.

8 Claims, 9 Drawing Figures

AUTOMATIC ELECTRONIC FLASH

BACKGROUND OF THE INVENTION

1. Field of the Invention

The present invention relates generally to automatic electronic flash, and particularly concerns the automatic electronic flash capable of automatic adjustment of amount of flashed light when photographic scenery is of rear light.

2. Description of the Prior Art

Automatic electronic flash, which has a function of automatically controlling amount of flashed light in response to the light reflected from a scene, is very useful to make good picture for an amateur photographer.

In an automatic electronic flash photographing for a rear light scene for instance in outdoor scene with portrait in a bright sky, namely in a fill-in flash photographing, there are the following problems.

When the automatic electronic photographing for the rear light scene is executed on trial, most probable operation sequence is: firstly, brightness of scene is measured by exposure measuring system of a camera for the photographic scene angle for a shutter speed appropriate for strobe synchronization, thereby to obtain suitable F-stop value for the scene, and secondly, F-stop number of the automatic electronic flash and the stop of the camera are adjusted to the above-mentioned suitable stop value.

When a rear light scene is considered, in most cases the back scene of the object is a vacant space, or even when not the vacant space, something to reflect light is at a very far distance. Accordingly, unlike the ordinary indoor flash photographing with automatic electronic flash, amount of light incident to light sensor of the automatic electronic flash during the photographic flash is very small. In other word, unlike the indoor photographing where lights are reflected from various matters surrounding the photographic object, in case of a rear light photographing, for instance in outdoor scene, there is substantially no reflection of light of the flash, since there are no surrounding matters in not far distance other than the photographic object. As a result, in the rear light photographing, the amount of light incident to light sensor of the automatic electronic flash becomes considerably smaller than that in the case of indoor flash phographing with the same automatic electronic flash.

Accordingly, when the automatic photographing of outdoor is carried out in the above-mentioned operation sequence, the photographing naturally results in an overexposuring, thereby making the resultant photograph whitish.

According to the experimental study of the inventors, it has been found that, for fill-in flash photographing for such scenes with mountain or sea as backgound, the photograph becomes overexposured by a degree of 1-2 F-stops as converted into the stop value, irrespective of the stop value used within the usually used stop value range of F1.4-F22.

Accordingly, it has been believed that the fill-in flash photographing is not satisfactorily made with automatic electronic flashing, and instead a manual flash apparatus has been used as follows: firstly shutter speed of the camera is set usually to 1/60 sec. and the brightness of the photographic scene is measured by appropriately setting film sensitivity in the camera or in an exposure meter, thereby to measure suitable stop value. And secondly, distance between the camera and the photographic object is measured and a product of the distance and the above-mentioned stop value is calculated and a guide number dial of the manual flash apparatus is adjusted to the value of the product.

The above-mentioned conventional manual setting of the flash apparatus, however, is troublesome for amature photographer of small experience, and the above-mentioned sequence of manual setting is not well understood, or setting of the guide number by the product is difficult for him or been forgot by him. Accordingly there are many liability of failure of the flash photography in backlight. And therefore, the rear light photography is considered difficult to produce good picture.

Furthermore in some case, even when the user can understand and operates the above-mentioned sequence of the manual flash photographing, it is necessary that the calculated guide number is always available on the flash apparatus, and in such case there is a necessity to change distance between the camera and the object or in some time the photographing of the object becomes impossible.

On the other hand, in order to solve the above-mentioned inconvenience, there has been many proposals for automatic electronic flashes easily usable for amateur photographer, but these modern devices are limited in a parmanent combination with camera. In view of the above-mentioned problem, there is a strong demand for a satisfactory automatic electronic flash capable of photographing even for rear light scenery without troublesome manual operation and calculation.

SUMMARY OF THE INVENTION

Accordingly the present invention purposes to provide an improved automatic electronic flash capable of backlight photographing in automatic electronic flash operation.

The automatic electronic flash in accordance with the present invention comprises key input means for inputting photographing data such as film sensitivity and shutter speed, key input reception means for outputting electric signals responding to input operation by the key input means, fill-in flash selection means for selecting fill-in flash photographing when a photographic scene has a rear lighting, display means for displaying display F-stop value to be set on a camera to be used to this automatic electronic flash, automatic F-stop value setting circuit for setting an automatic F-stop value responding to an F-stop selection signal, a light measuring circuit for measuring brightness of scene and issuing brightness signal responding to the measurement, operation mode selecting means for selecting ordinary mode for photographing ourdinarily lighted scene and fill-in flash mode for photographing a rear-lighted scene responding to output of the fill-in flash selection means, light measuring start means for setting starting time of light measuring in fill-in flash mode, measured F-stop value setting means for setting measured F-stop value, being based on the brightness signal, film sensitivity and shutter speed of the camera, to produce measured F-stop value signal, display signal generating means for generating display F-stop value signal being based on the measured F-stop signal, to actuate the display means, automatic F-stop value modifying means for generating a first automatic F-stop value signal which modifies the measured F-stop value signal to a vaue lower by 1-2 EV than the display stop value signal, and automatic F-stop signal generating means for generating a second automatic F-stop value signal which corresponds to the first automatic F-stop value signal in the automatic F-stop value modifying means and sets the automatic F-stop value setting circuit.

The automatic electronic flash of the present invention can perform automatic electronic flashing even in the backlight scene by selecting stop value which is lower by (1.5±0.5) EV than the stop value majored and displayed in the exposure meter or camera.

DESCRIPTION OF THE PREFERRED EMBODIMENT

Further details of the present invention is described on the preferred embodiments with reference to the accormpanying drawings.

Figure 1:
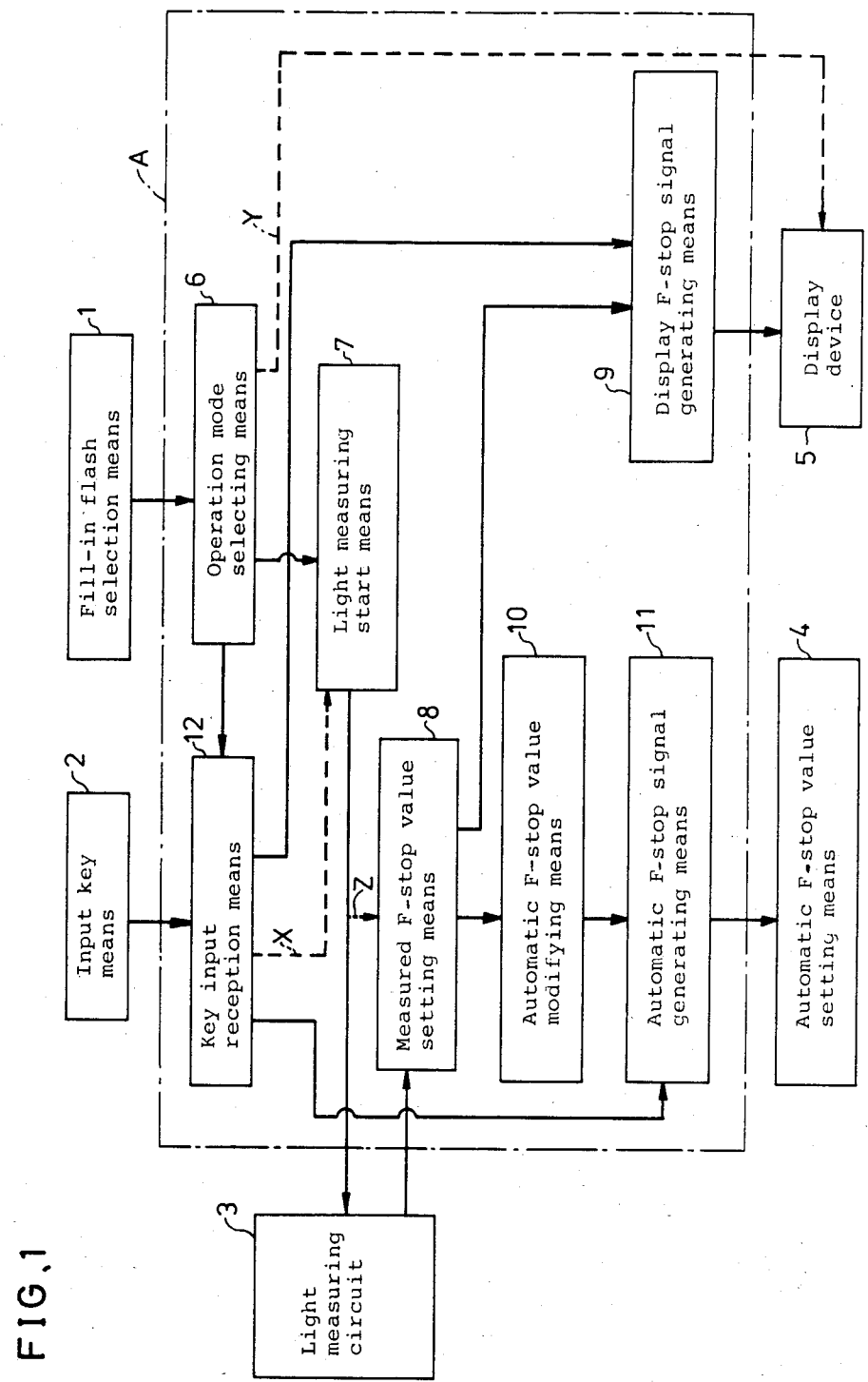
FIG. 1 is a block diagram showing a main part of an embodiment of an automatic electronic flash of the present invention.

FIG. 1 is a block diagram showing a main part of an embodiment of an automatic electronic flash of the present invention.

A fill-in flash selection means 1 detects whether an automatic adjustment of amount of flashed light in ordinary condition is to be excuted or the automatic adjustment of amount of flashed light in rear light condition is to be executed, by utilizing, for example, a manual switch or a brightness distribution of a scene. An input key means 2 inputs an F-stop value at ordinary automatic adjustment of amount of flashed light by manipulation. A light measuring circuit 3 measures brightness of a scene according to a measuring start signal. An automatic F-stop value setting means 4 sets a plural F-stop values according to an automatic F-stop value signal. A display device 5 is a liquid crystal display means, and displays various F-stop value according to a below-mentioned display F-stop signal.

An area A surrounded by a chain line shows a micro computer which operates as the above-mentioned controlling means. An operation mode selecting means 6 in the micro computer A selects an ordinary automatic adjustment of amount of flashed light mode, which is hereafter is referred to as a first operation mode, or a mode of rear light automatic adjustment of amount of flashed light, which is hereafter is referred to as a second operation mode.

A light measuring start means 7 is selected and operates when the operation mode selecting means 6 selects the second operation mode, thereby to issue the measuring start signal to the light measuring circuit 3 for driving it. A measured F-stop value setting means 8 issues an automatic F-stop value signal responding to the light signal issued from the light measuring circuit 3 and taking account of, for example, an ASA sensitivity and strobe-synchronizing shutter speed. A display F-stop signal generating means 9 generates a display F-stop signal responding to an F-stop value, which is to be displayed on a display device 5. An automatic F-stop value modifying means 10 modifies the measured F-stop value signal from the measured F-stop value setting means 8 to a signal having a value being lower by 1-2 EV than the measured F-stop value signal. An automatic F-stop signal generating means 11 generates the automatic F-stop signal for controlling the operation of the automatic F-stop value setting means 4 responding to a-modified signal issued from the automatic F-stop value modifying means 10. A key input reception means 12 receive an operation of the input key means 2 when at least the operating mode selecting means 6 selects the first operation mode and issues a signal to the key input reception means 12, thereby to control the automatic F-stop signal generating means 11 and the display F-stop signal generating means 9.

Incidentally, the modifying amount of the automatic F-stop value modifying means 10 is, as mentioned-above, based on an experiment,in which we acknowledged that in general rear light condition the exposure becomes, irrespective of the F-stop value one or two steps over in F-stop value equivalent than the optimum exposure.

The operation of the automatic electornic flash of the present invetion, constituted as above is as follows.

When the fill-in flash selection means 1 selects the ordinary automatic electronic flash photographing condition, the operation mode selecting means 6 selects the first operation mode and makes the light measuring start means 7 not operate.

At the time, the operating mode selecting means 6 makes the key input reception means 12 operate, thereby to make the automatic F-stop signal generating means 11 and the display F-stop signal generating means 9 operate responding to the operation of the input key means 2. Thus the automatic F-stop value setting means 4 and the display device 5 are operated and the requested F-stop value is set and displayed.

Incidentally, the light measuring circuit 3 and the measured F-stop value setting means 8 and so on do not operate since the light measuring start means 7 does not operate on account of the first operation mode.

Such automatic electronic flash that any F-stop value is displayed on the display device 5 according to the operation of the input key means 2 and the F-stop value responding to the display F-stop value is set in the automatic F-stop value setting means 4, is put in practical use and known of course.

When the fill-in flash selection means 1 selects the automatic electronic flash photographing condition in rear light, the operation mode selecting means 6 selects the second operation mode and makes the light measuring start means 7 operate and makes the key input reception means 12 not operate.

Therefore, the light measuring circuit 3 starts to measure the brightness of the scene according to the measuring start signal from the light measuring start means 7.

The light signal issued from the light measuring circuit 3 is supplied to the measured F-stop value setting means 8. The measured F-stop value setting means 8 supply the automatic F-stop value modifying means 10 and the display F-stop signal generating means 9 with the measured F-stop value signal responding to the brightness of the scene.

Therefore, the display F-stop signal generating means 9 supplies the dispaly F-stop responding to the measured F-stop value signal with the display device 5. The automatic F-stop value modifying means 10 modifies the measured F-stop value signal to a signal having a value lower by 1–2 EV than the measured F-stop value signal, and supplies the automatic F-stop signal generating means 11 with the modified automatic F-stop value signal.

Thus, the display device 5 displays the display F-stop value responding to the measured F-stop value set by the measured F-stop value setting means 8. The automatic F-stop value setting means 4 sets an automatic F-stop value being lower by 1–2 EV than the measured, namely, displayed F-stop value.

That is, when the automatic electronic flash photographing condition is rear light, namely, the second operation mode is selected by the operation mode selecting means 6, the F-stop value displayed on the display device 5 and the automatic F-stop value are different to each other, to the contrary of case of the second operation mode.

For an example, the automatic electronic flash of the present invention operates in a manner that the automatic F-stop value setting means 4 sets F5.6, being lower by 1 EV, as the automatic F-stop value, than the display F-stop value F8 displayed on the display device 5. Incidentally, the key input reception means 12 does not operate when the operation mode selecting means 6 selects the second operation mode. But by making the key input reception means 12 issue a signal as indicated by broken line X only at the second operation mode, the input key means 2 can be utilized for controlling the light measuring start means 7, though the input key means 2 can not be utilized for controlling the display F-stop value. This operation of the key input reception means 12 has very high practical value since it is preferable that the light measuring operation by the light measuring circuit 3 can be executed at any time.

Further the display device 5 can display a figure or a character showing the selection of the second operation mode at the second operation mode by utilizing a signal indicated by the broken line Y from the operation mode selecting means 6. Thus the automatic electronic flash of the present invention can be more practical.

Figure 2:
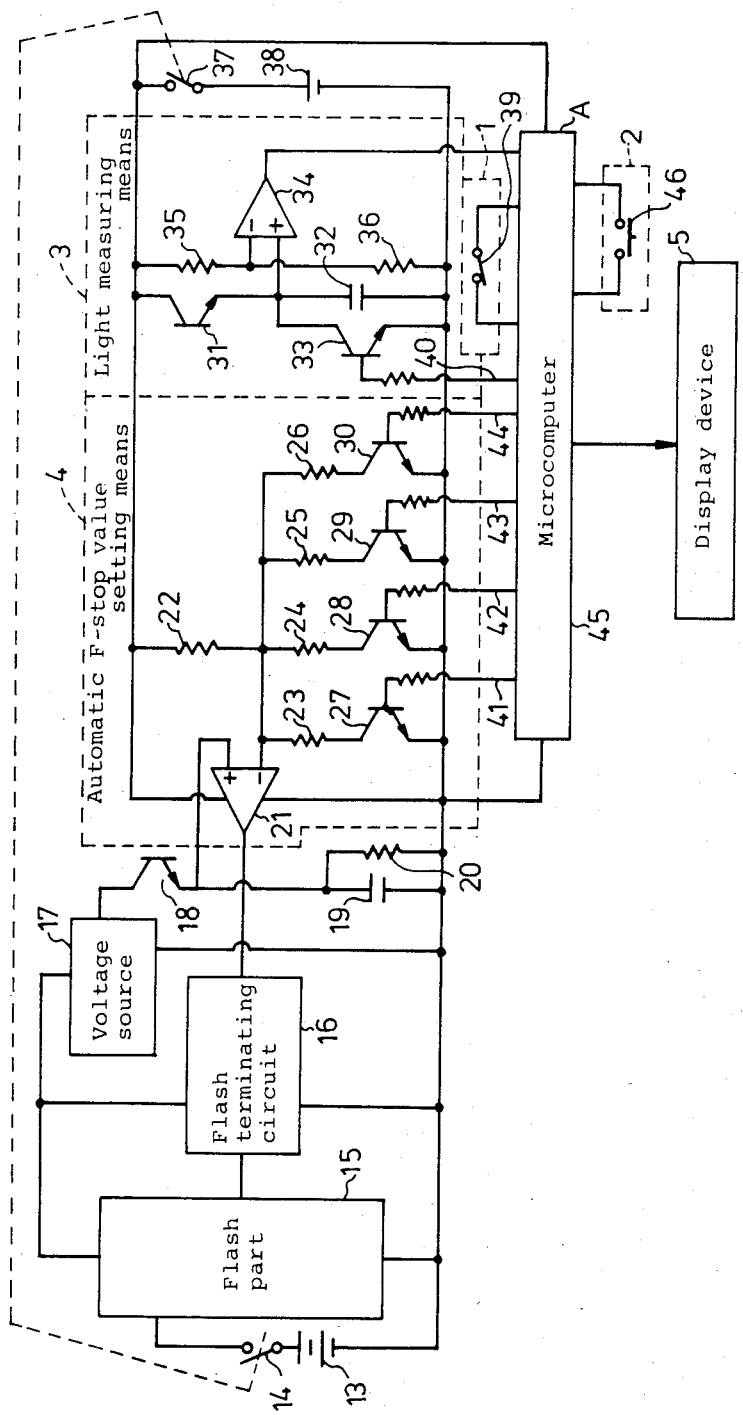
FIG. 2 is an electronic circuit showing an embodiment of an automatic electronic flash of the present invention corresponding to the block diagram in FIG. 1.

FIG. 2 shows an electric circuit of an embodiment of the automatic electronic flash of the present invention corresponding to the block diagram of FIG. 1.

The parts 1 to 5 in FIG. 2 corresponds to the parts 1 to 5 in FIG. 1, respectively. A power source 13 supplies electric power to the flash part 15 through a source switch 14. The flash part 15 comprises a known DC-DC converter circuit, a main capacitor and flash discharge tube and so on. A flash terminating circuit 16 controls the flashing operation of the flash part 15. A voltage source 17 generates a certain voltage in concurrence with the flashing operation of the flash part 15. An automatic light sensour 18 receives a reflected light from the scene irradiated by the flash part 15. An integral capacitor 19 and a discahrge resistance 20 are used for automatic adjustment of the amount of the flashed light.

The terminal voltage of the integral capacitor 19 is supplied to a non-inverting input terminal of a comparator 21. Resistances 22–26 controls the operational level of the comparator 21, thereby to set the automatic F-stop value. Switching devices 27–30 each comprising a transistor control the connection condition between the resistance 22 and the resistances 23–26, thereby to control the automatic F-stop value. These components of the comparator 21, the resistances 22–26 and switching devices 27–30 etc. form the automatic stop value setting means 4.

The light measuring means 3 comprises a light measuring sensor 31 which receives an ordinary light from the scene side, a transistor 33 as a switching element which controls the connection condition between the sensor 31 and an integral capacitor 32 for light measuring, a comparator 34 to which a terminal voltage of the capacitor 32 is supplied at its non-inverting input terminal, and resistances 35, 36 for setting the operation level of the comparator 34. A cooperative swich 37 cooperates with the source switch 14. A power source 38 operates as a reference source. A turning switch 39 is OFF at the ordinary automatic electronic flash photographing condition and is ON at the rear light automatic electronic flash photographing condition, thereby to form the fill-in flash selection means. A terminal 40 is an output terminal of the light measuring start means 7 in the micro computor A. Terminals 41–44 are output terminals of the automatic F-stop signal generating means 11 likewise. A terminal 45 is an output terminal of the display F-stop signal generating means 9. A shift switch 46 forms the input key means 2.

The operation of the automatic electronic flash shwon in FIG. 2 is described as follows.

First, the relation between the micro computor A and the flashing measuring means 3.

In the micro computor A, the output terminal 40 of the light measuring start means 7 issues high level (indicated by H, hereinafter) when the operation mode selecting means 6 selects the first operation mode, that is, when the turning switch 39 of the fill-in flash selection means 1 is OFF. Further, the output terminal 40 issues low level (indicated by L, hereinafter) for a certain term at a certain interval when the turning switch 39 is ON, thereby to set the second operation mode.

Therefore, the light measuring means 3 does not operate when the output terminal 40 is H, since the transistor 33 becomes conductive and the integral capacitor 32 is short-circuited. Accordingly, the light measuring means 3 operates only when the output terminal 40 is L. The operation of the light measuring means 3 is as follows. When the charged voltage of the integral capacitor 32 charged by a light current of the light measuring sensor 31 responding to the brightness of the scene side becomes exceeding the reference level set by the dividing ratio of the resistances 35, 36 and the reference power source 38, the comparator 34 operates to turn over the output. The output of the comparator 34 is supplied to the micro computor A. In the micro computor A, the measured F-stop value setting means 8 set a measured F-stop value responding to the brightness of the scene side taking account of sensitivity of the film etc. as above-mentioned. The setting is obtained from, for example, a time length from a time when the output terminal 40 becomes L to another time when the output of the comparator 34 turns on. In the embodiment, the output of the light measuring start means 7 is supplied to the measured F-stop value setting means 8 as indicated by broken line Z. Thus the measured F-stop value setting means 8 calculates the time unitl the charged voltage of the integral capacitor 32 reaches the reference level by utilizing the output of the light measuring start means 7.

Now, in the circuit shown in FIG. 2, when the turning switch 39 is OFF thereby to make the automatic flash operate as the ordinary automatic electronic flash photographing condition, the light measuring start means 7 and the light measuring circuit 3 etc. in the micro computor A do not operate as above-mentioned.

In this condition, when the power source switch 14 is closed, the flash part 15 starts to operate and the preparation of flashing, for example, the charging of a main capacitor not shown in FIG. 2 is executed.

At the same time, the switch 37 is closed and the micro computor A executes the above-mention first operation mode. By operating the shift switch 46 of the input key means 2, the automatic F-stop signal generating means 11 and the display F-stop signal generating means 9 operate, and therefore the preferable automatic F-stop value is set and displayed.

As to the practical setting operation of the preferable automatic F-stop value in FIG. 2, the H signal is issued from the output terminals 41-44 of the automatic F-stop signal generating means 11 of the micro computor A in order by the operation of the shift switch 46. Accordingly the transisters 27-30 of the automatic F-stop value setting means 4 are made conductive in order. Thus the relation between the resistance 22 and resistances 23-26 is controled, thereby to set the operation level of the comparator 21 preferably. In practice, the relation between the set automatic F-stop value and the output of the output terminals 41-44 of the micro computor A is shown for example in table 1.

TABLE 1

| F | Output terminal | | | |
|---|---|---|---|---|
|  | 41 | 42 | 43 | 44 |
| 2.8 | H | L | L | L |
| 4 | L | H | L | L |
| 5.6 | L | L | H | L |
| 8 | L | L | L | H |

That is, when user wishes to set the automatic F-stop value F5.6, he can operate the shift switch 46 until only the output terminal 43 issues H signal, that is, he can operate the shift switch 46 until the display device 5 displays F5.6.

When the preferable automatic F-stop value is set as above-mentioned and the flash part 15 flashes, the reflected light from the scene is received by the automatic light sensor 18 and the charged voltage of the integral capacitor 19 responding to the received light amount is compared with a voltage level corresponding to the preferable automatic F-stop value by the comparator 21. When the charged voltage of the capacitor 19 exceeds the voltage level, the comparator 21 drives the flash terminating circuit 16, thereby to stop the operation of the flash part 15. Therefore, by setting the F-stop value displayed on the display device 5 on the camera, user can execute a satisfactory automatic electronic photographing corresponding to the F-stop value.

The operation as above-mentioned is a flash operation in an ordinary automatic eletronic flash photographing executed by setting a desired F-stop value.

Next, the flash operation of the automatic electronic flash photographing in rear light condition is as follows.

The turning switch 39 of the fill-in flash selection means 1 is closed in this case.

Therefore, the operation selecting means 6 in micro computor A selects the second operation mode and the light measuring start means 7 operates.

Therefore, as above-mentioned, when the output terminal 40 of the micro computor A becomes L, the light measuring means 3 operates. The measured F-stop value setting means 8 of the micro computor A sets the measured F-stop value by utilizing the light signal of the light measuring circuit 3.

Further, as above-mentioned in FIG. 1, the measured F-stop value is supplied to the automatic F-stop signal generating means 11 through the automatic F-stop value modifying means 10 and the display F-stop signal generating means 9. Therefore, the display F-stop signal and the automatic F-stop value signal are made different by the above means 8, 9, 10 and 11 etc.

Examples between the relation of the measured F-stop value, the display F-stop value, the automatic F-stop value and the outputs of the output terminals 41-44 of the micro computor A, are shown in table 2.

TABLE 2

| Measured F-stop value | Display F-stop value | Automatic F-stop value | Terminal 41 | Terminal 42 | Terminal 43 | Terminal 44 |
|---|---|---|---|---|---|---|
| 4 | 4 | 2.8 | H | L | L | L |
| 5.6 | 5.6 | 4 | L | H | L | L |
| 8 | 8 | 5.6 | L | L | H | L |
| 11 | 11 | 8 | L | L | L | H |

In the table 2, though the measured F-stop value is same as the display F-stop value, namely, as the F-stop value to be set in the camera, the measured F-stop value in case of including the object is lower by only about 0.5 step than that in case of including no object, i.e. mere background, according to the inventor's experiments. Therefore, even though the display F-stop value is set to the camera, the scenery is in over-exposure only by 0.5 step. Such slight over-exposure can be, covered by the film latitude. Further, considering the rear light condition, the over-exposure offers natural feeling to the photograph.

The effect on account of the flashing is of no problem since the scenery exists generally far away in case of rear light condition. That is, it is acknowledged that even though picture is taken with flashes under the above condition, the over-exposure of 0.5 step does not vary.

When the camera is set at F8 responding to the display F-stop value and the flash part 15 operates under such condition that requested display F-stop value and the automatic F-stop value are set, for example, automatic F-stop value F5.6 is set according to the table 2, by utilizing the micro computor A; the background has adequate exposure by the film latitude as above-mentioned, and the object is controlled by the automatic F-stop value of F5.6.

However, the practical amount of the light supplied to the object becomes larger than that in case of the ordinary photographing at automatic F-stop value F5.6, since the operation timing of the light adjusting circuit of the automatic electronic flash is later than that in ordinary photographing because the amount of light received by the automatic light sensor is small.

Such increase of light amount is about 1-2 step in F-stop value equivalent, namely, F8 to F11 against F5.6, accordingly the above display F-stop value F8 can obtain adequate exposure.

Therefore, as a photograph, both the background and object have adequate exposure.

As above-mentioned, user can use the automatic electronic flash easily in rear light condition by setting the display F-stop value on the camera.

Though the number of selectable automatic F-stop was four in FIG. 2, it can be increased. As the fill-in flash selection means 1, the manually operated switch is used in FIG. 2, but an electronic means which can issue such output signal as to respond to the rear light condition and the ordinary light condition by detecting, for example, detecting electrically the distribution of brightness with measuring brightness partly in the picture angle, can be used.

Further, when the measured F-stop value varies from last measured F-stop value on account of, for example, the transferring of the camera or the variation of the sun light, or is such value that the automatic F-stop value can not be set on the automatic F-stop value setting means 4, that is, in case of table 2, when the measured F-stop value F5.6 varies to the measured F-stop value F8, or becomes more than F11 or less than F4, the practical photographing can not be executed. In such case it is preferable and practical that the automatic electronic flash drives warning device, for example issues, a buzzer.

Figure 3:
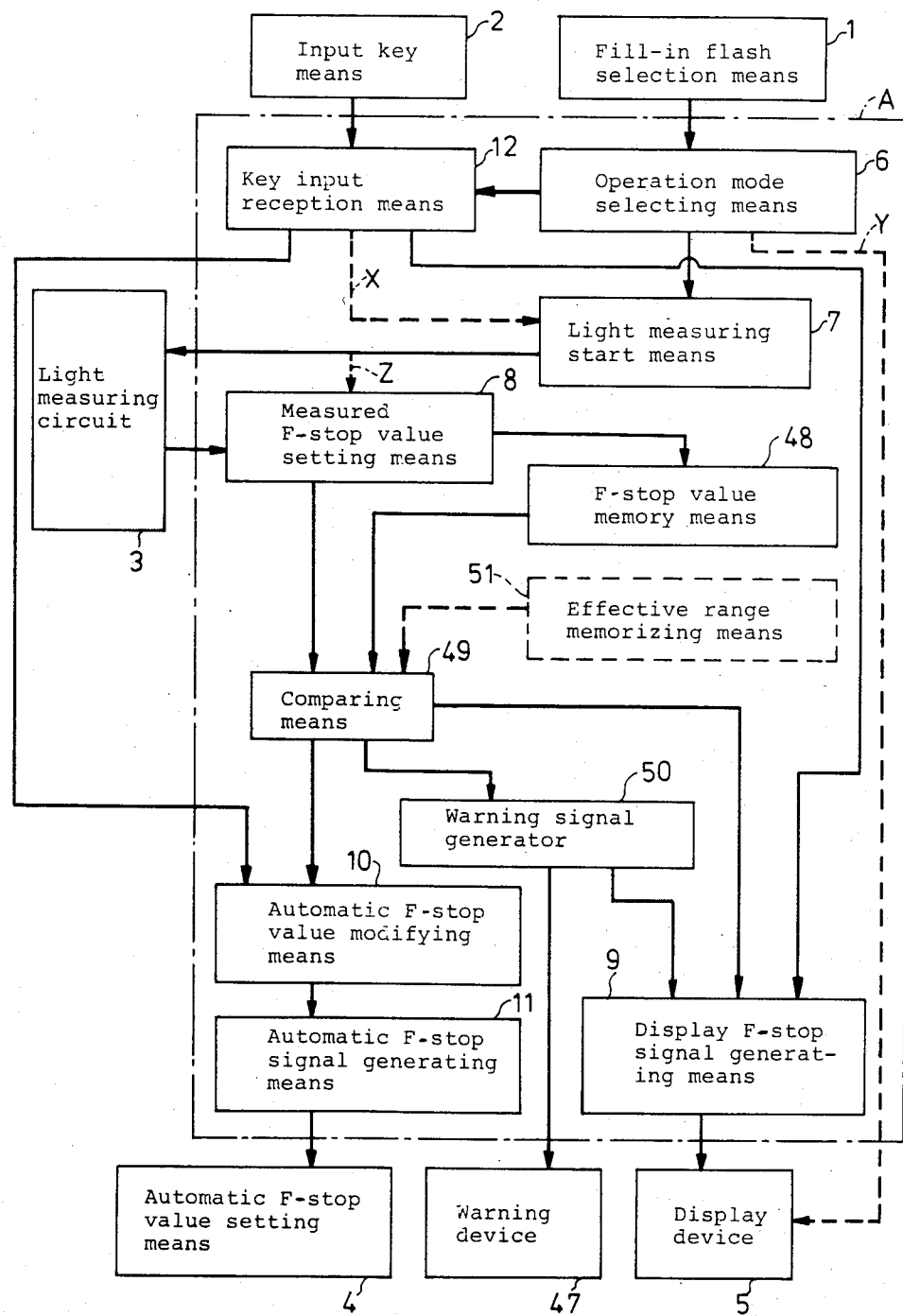
FIG. 3 is a block diagram showing a main part of a still embodiment of an automatic electronic flash of the present invention.

FIG. 3 shows a block diagram of still embodiment of the automatic electronic flash of the present invention, having the warning device which issues warning signal when the measured F-stop value varies from the last measured F-stop value.

As apparent from the FIG. 3, such embodiment has further an F-stop value memory means 48, comparing means 49, a warning signal generator 50 at the output side of the measured F-stop value setting means 8, and a warning device 47 in addition to the components in FIG. 1. The warning device 47 comprises a device for issuing a buzzer according to a warning signal from the warning signal generator 50.

The F-stop value memory means 48 memorizes the measured F-stop value signal supplied from the measured F-stop value setting means 8 and issues the last measured F-stop value signal to the comparing means 49, when the measured F-stop value setting means 8 issues the measured F-stop value signal according to the output of the light measuring circuit 3. The comparing means 49 is supplied with the measured F-stop value signal from the measured F-stop value setting means 8 and the last measured F-stop value signal from the F-stop value memory means 48, thereby to compare both signals to each other.

When the two values of the two signals are same, the comparing means 49 issues the present measured F-stop value signal caused by the present light measuring to the display F-stop signal generating means 9 and the automatic F-stop value modifying means 10. When the two values of the two signals are different, the comparing means 49 issues a warning start signal for making the warning signal generator 50 operate, in addition to the above-mentioned operation.

The warning signal generator 50 operates according to the warning start signal issued from the comparing means 49, thereby to issue a warning signal for making the warning device 47 operate to the warning device 47. At the same time, the warning signal generator 50 issues a display F-stop value control signal to the display F-stop signal generating means 9, the display F-stop value control signal being for realizing such operation that the last display F-stop value and a present display F-stop value responding to the present measured F-stop value obtained this time, turns on and off alternately.

In the embodiment of FIG. 3, when the rear light condition varies caused by, for example, the transferring of the camera in the automatic electronic flash photographing operation of FIG. 1, the F-stop value memory means 48 and the comparing means 49 detect the variation of the measured F-stop value caused by the present light measuring operation. The comparing means 49 issues the present measured F-stop value signal which is different from the last measured F-stop value signal, to the automatic F-stop value modifying means 10, thereby to change the setting of the automatic F-stop value.

Further, the comparing means 49 issues a warning start signal to the warning signal generator 50.

The warning signal generator 50 drives the warning device 47 and controls the display F-stop signal generating means 9 as above-mentioned.

Therefore, in the embodiment of the automatic electronic flash of FIG. 3, the warning device 47 issues a warning signal as like a buzzer in order to recommend the F-stop value set in the camera according to the last display F-stop value, and the last display F-stop value and the present display F-stop value turns on and off.

The automatic F-stop value setting means 4 sets the automatic F-stop value responding to the display, the warning device 47 issues a warning signal like a buzzer in order to recommend the F-stop value set in the camera according to the last display F-stop value, and the last display F-stop value and the present display F-stop value turns on and off.

The automatic F-stop value setting means 4 sets the automatic F-stop value responding to the display F-stop value being lower by 1-2 EV than the present display F-stop value.

Therefore, the user can realize easily the variation of the rear light condition and can deal with the variation without complicated operation by resetting the F-stop value of the camera according to the present display F-stop value on the display device 5.

Furthere, in the display operation at the warning time, for example, in the turning on and off operation, of the last display F-stop value and the present F-stop value, the turning on times of the two values can be different to each other in order to make the user easy to acknowledge the F-stop value to be set in the camera.

Further, it seems over-warning that the warning operation continues until the next light measuring operation is executed by the light measuring start means 7. Therefore, in case of providing such warning device, it is extremely practical for the embodiment in FIG. 3 that as in FIG. 1, the key input reception means 12 can drive instantly the light measuring start means 7 according to the operation of the input key means 2 as indicated by the broken line X in FIG. 3, thereby to drive instantly the light measuring circuit 3, when the operation mode selecting means 6 selects the second operation mode responding to the rear light condition. Because next light measuring operation is executed instantly by operating the input key means 2 responding to the warning and the warning operation caused by the operation of the comparing means 49 is stopped instantly if the rear light condition does not vary further, and the varied display F-stop value and the automatic F-stop value are set correctly.

The warning operation executed when the output value of the light measuring circuit 3 is outside the range in which the automatic F-stop value can be set, is made as follows.

An effective range memorizing means 51 which memorizes the range of the automatic F-stop value which can be set, is comprised independently, namely, so as not to receive the output signal for on the measured F-stop value setting means in place of the above-mentioned F-stop value memory means 48. The comparing means 49 is constituted to compare the output signal of the F-stop value setting means 8 with the output of the effective range memorizing means 51, thereby to issue the warning start signal for driving the warning signal generator 50 and to issue a signal for controlling the operation of the display F-stop signal generating means 9 when the output of the F-stop value setting means 8 is exceeding the above-mentioned effective range.

That is, in the above embodiment, the output of the F-stop value setting means 8 and the contents of the effective range memorizing means 51 are compared to each other. When the output is exceeding the range, the warning signal generator 50 is driven, thereby to issue the warning as like the buzzer as in the case of the variation of the rear light condition. Incidentally, while the warning operation is executed, it is meaningless that the exceeding display F-stop value is displayed since the photographing can not be executed, therefore, it is preferable that the display F-stop signal generating means 0 disables the display device 5, for example, not to display the F-stop value. Thus user can recognize easily that the measured light result is outside the range. Incidentally, the time length of continuing the warning can be set by utilizing the input key means 2 as above-mentioned.

In adition to the above, a warning system for variation of the rear light condition and a warning system for outside-of-range of the measured light may be provided at the same time.

As above-mentioned, the automatic electronic flash operation of the automatic electronic flash of the present invention has been described.

Now, the setting operation of the measured F-stop value setting means 8 in rear light condition is considered below in detail. Incidentally, the following description as to the measured F-stop value setting means 8 is premised on such assumption that the light measuring circuit 3 comprises the comparator 34 which executes the turning operation when the received light amount reaches the certain value as above-mentioned.

The measured F-stop value setting means 8 can issue signals responding to at least several number of F-stop values since the measured F-stop value setting means 8 sets the F-stop value which is to be set in the camera. In the former embodiment, the number is 4.

Therefore, the measured F-stop value setting means 8 should execute plural judging operations with regard to the measured light outputs obtained by the light measuring circuit 3. Further, it is desired that the judging operation should correspond exactly to the brightness.

However, there is a problem as below-mentioned, when considering the practical photographing operation.

That is, the F-stop value set by the measured F-stop value setting means 8 is displayed as an F-stop value to be set in the camera. User sets the F-stop value in the camera, looking at the displayed F-stop value. Provided that the setting operation of the measured F-stop value setting means 8 is exactly responding to the measured desirable brightness, and that the brightness is around a boundary of the range of the judging operation, the measured F-stop value setting means 8 will set two F-stop values alternately as the brightness slightly changes.

Therefore, the display device displays two figures of the F-stop values alternately, accordingly user is puzzled in setting F-stop value in the camera. Therefore, the user can not execute the photographing smoothly and he may lose a shutter timing.

The phenomena showing the alternate displaying of the different F-stop values can not be disregarded in disigning a good automatic flash, since the rear light condition occurs almost in the matural light condition and the variation of the background occurs often under the natural light condition.

Therefore, for user the display fluctuation phenomena is a large problem.

Hitherto, such constitution that the control operation is executed according to the measured light signal obtained by measuring the brightness of the scene, is known in, for example, an unexamined Japanese publication No. Sho 56-87028. In the strobe-built-in camera of the unexamined Japanese publication No. Sho 56-87028, a flashing part of the built-in strobe is transferred to an operative position when the brightness of the scene is inside a predetermined range. The measured light signal obtained by measuring the brightness of the scene is utilized as a signal for judging whether the flashing is necessary or not to photograph, thereby to control the using of the strobe device.

In the constitution, the measured light signal is utilized for only one judgment, namely, such judgment that the brightness is such degree to need the strobe or not. Therefore the comparing operation with only one reference signal is executed, accordingly the above-mentioned problem does not occur in this comparing operation.

Further, the unexamined Japanese publication No. Sho 56-87028 briefly discloses another embodiment in which the flashing part of the built-in strobe automatically transfers between the operative position and the non-operative position responding to the brightness of the scene.

That is, when the brightness is so low as to need the strobe, the flashing part is transferred from the non-operative position to the operative position, and under such condition, the flashing part automatically transfers to the non-operative position from the operative position when the brightness of the scene is so high not to need.

As a result, in the above-mentioned embodiment, the measured light signal according to the scene brightness is used for two kinds of judgments to the contrary of the former embodiment, namely: the judgment whether the strobe is necessary or not and the judgment whether the strobe is not necessary or not.

Therefore, in the last embodiment, when the reference value is a single value as the former embodiment and the measured light signal becomes near the reference value, the operation for transferring the flashing part to the operative position and the operation for transferring the flashing part to the non-operative position are produced sequentially.

Therefore, the unexamined Japanese publication of No. Sho 56-87028 discloses such art to add non-sensitive zone to the above judging operation, with only sentence, namely, without figures.

The contents of the non-sensitive zone is barely assumed to mean that, in accordance with the above-mentioned embodiment, the flashing part transfers to the operative position when the scene brightness is lower than a predetermined level and the flashing part transfers to the non-operative position when the scene brightness becomes larger by a certain amount than the above predetermined level. That is, the two judgment references for starting the two transferring operations have the certain amount difference to each other.

However as above-mentioned, the unexamined Japanese publication of No. Sho 56-87028 discloses only such abstract statement as to provide two kinds the non-sensitive zone of the controlling operations and does not suggest such case at all that there are more than three kinds of controlling operations.

That is, the unexamined Japanese publication of No. Sho 56-87028 does not disclose that judging operations of not less than three kinds are executed according to the measured light signal obtained by measuring the brightness of the scene and thus the setting at least several F-stop values to be set in the camera and the displaying then are executed.

Figure 4:
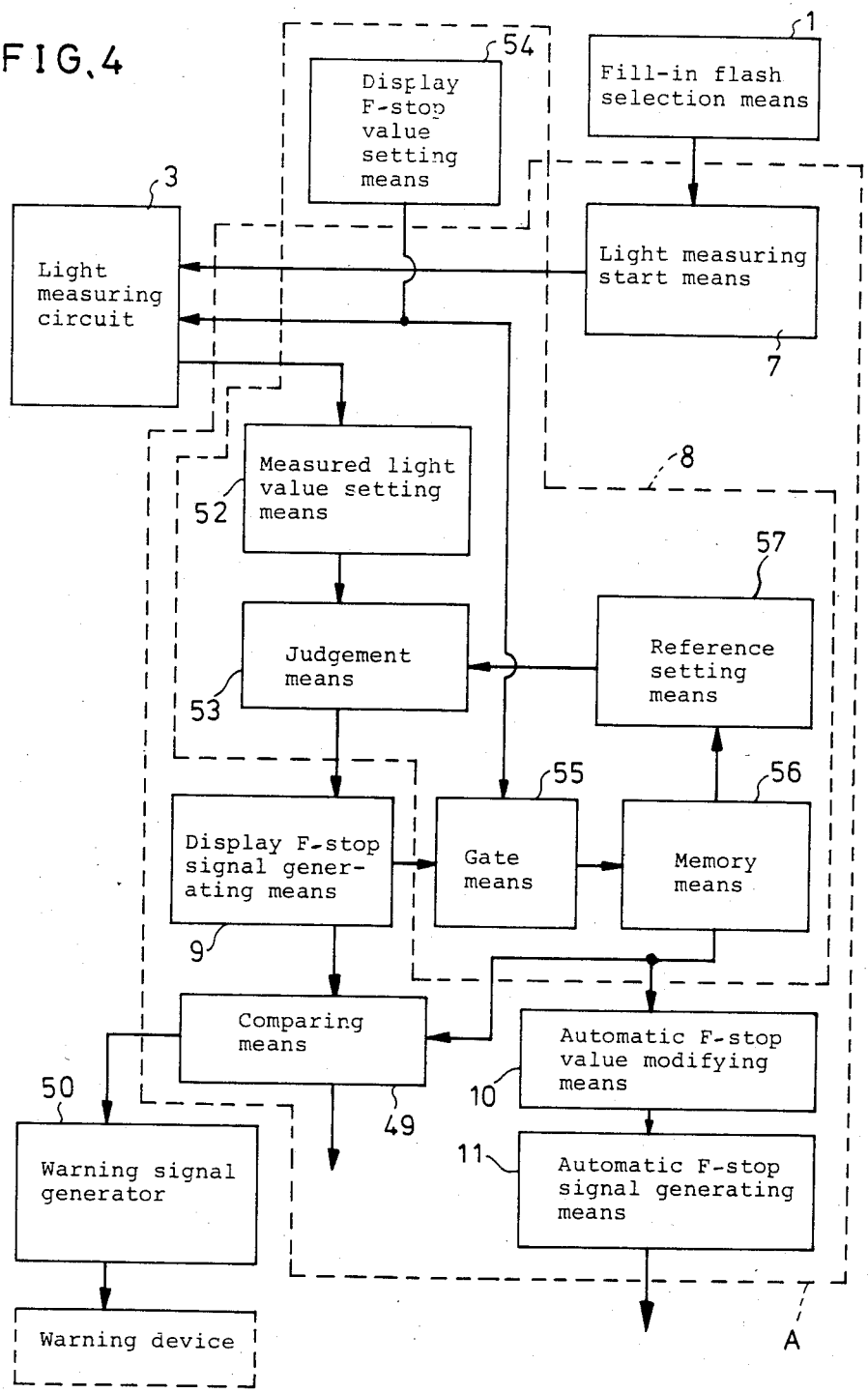
FIG. 4 is a block diagram showing the main part of an embodiment of the measured F-stop value setting means and so on in FIG. 1 and FIG. 3.

FIG. 4 is block diagram showing main part of another embodiment of the automatic electronic flash of the present invention, comprising the measured F-stop value setting means 8, deviced to dissolve the above-mentioned problems. In FIG. 4, the parts 1, 3, 7, 8, 10, 49 and 50 corresponds to the parts 1, 3, 7, 8, 10, 49 and 50 in FIGS. 1, 2 and 3. Incidentally, the embodiment in FIG. 4 is corresponding to the embodiment in FIG. 3 but can correspond to the embodiment in FIG. 1 of course.

A measured light value setting means 52 sets a measured light value responding to the scene brightness by receiving the measured light signal of the light measuring circuit 3. A judgment means 53 compares the measured light value set by the measured light value setting means 52 with a certain reference value for judgment, thereby to set the display F-stop value responding to the scene brightness and to issue a setting signal of the display F-stop value. A display F-stop value setting means 54 comprises, for example, a manual key input means and is driven when the user determines the F-stop. The display F-stop value setting means 54 drives forcibly the light measuring circuit 3 regardless of the operation of the light measuring start means 7 and open a gate means 55, thereby to supply the display F-stop value signal issued from the display F-stop signal generating means 9 when the light measuring circuit 3 operates forcibly, to a memory means 56.

The gate means 55 opens for a certain time by the operation of the display F-stop value setting means 54 and makes the output of the display F-stop value signal generating means 9 supplied to the memory means 56. The memory means 56 memorizes the display F-stop value signal supplied through the gate means 55 which operates by the display F-stop value signal setting means 54.

Incidentally, the display F-stop value signal which is supplied from the display F-stop signal generating means 9 to the memory means 56 through the gate means 55 is represented as a first display F-stop value and the display F-stop value signal memorized in the memory means 56 by the above operation is represented as a second display F-stop value signal hereinafter since the two display F-stop value signals are used for different operations.

A reference setting means 57 supplies usually a first judgment reference which is used for judging generally the scene brightness to the judgment means 53. When the second display F-stop value signal memorized in the memory means 56 by the operation of the display F-stop value setting means 54 is supplied to the reference setting means 57, the reference setting means 57 sets a second judgment reference which is different from the first judgment reference and is corresponding to the second display F-stop value signal, and supplies the second judgment reference to the judgment means 53.

The comparing means 49 in the embodiment of FIG. 4 compares the first display F-stop value signal issued from the display F-stop signal generating means 9, with the second display F-stop value signal memorized in the memory means 56, thereby to drive the warning signal generator 50 when the first and second display F-stop value signals are different, and to issue, as it is, the first display F-stop value signal or the second display F-stop value signal which is issued from the display F-stop generating means 9 or the memory means 56 when the first and second display F-stop value signals are equal. The comparing means 49 has such function to drive the operation of the warning signal generator 50 which warns that the F-stop value to be set in the camera, varies on account of the variation of the brightness, therefore has same function as the comparing means 49 in the embodiment in FIG. 3, accordingly both comparing means 49 have same reference number 49. The memorizing operation of the second display F-stop value signal of the memory means 56 is such that once the display F-stop value setting means 54 operates, the memorized contents at the operation timing is held until the next operation of the display F-stop value setting means 54.

The operation of the above-mentioned embodiment of the automatic electronic flash of the present invention is as follows.

The measuring light value setting means 52 in this embodiment, is constituted such that the measured light value is issued as a time signal by detecting the time until the voltage value of a capacitor charged by the light current flowing through the light receiving element included in the light measuring circuit 3, reaches a certain value.

First, an operation in case of the non-operation of the display F-stop value setting means 54 is described as follows.

In this case, when the scene is in rear light condition, the fill-in flash selection means 1 for selecting the rear light condition manually or automatically, operates and the light measuring start means 7 operates for making the light measuring circuit 3 operate with a certain period of repetition.

The light measuring circuit 3 measures the scene brightness in a certain period by the output of the light measuring start means 7 and issues each measured light signal by each measuring operation to the measured light value setting means 52.

The measured light value setting means 52 issues the time signal responding to the brightness as the measured light signal.

Such time signal is compared with a judgment reference in the judgment means 53. In this case, since the display F-stop value setting means 54 does not operate, the reference setting means 57 supplies general first judgment reference, for example as shown in FIG. 5, to the judgment means 53, therefore general comparing judgment operation is executed.

Figure 5:
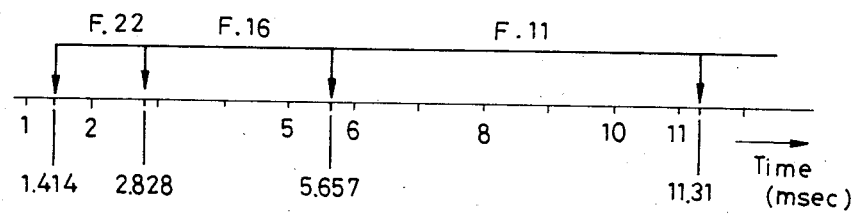
FIG. 5 is a chart showing a first judgement reference which is used in a judgement means in FIG. 4.

That is, when the measured light value issued by the measured light value setting means 52 is 2 msec, the judgment means 53 makes such judgment that F22 is to be set as the display F-stop value as apparent from FIG. 5. Thus the judgment means 53 issues a signal which makes the display F-stop signal generating means 9 issue a setting signal to the first display F-stop value signal to the display F-stop signal generating means 9 to display F22 on the display device which is not shown.

The first display F-stop value signal produced by the above operation is supplied to the comparing means 49 and is compared with the contents in the memory means 56.

But in this case, the display F-stop value setting means 54 does not operate, therefore the gate means 55 is closed and the memory means 56 memorizes no signal. Therefore, the result of the comparing operation is that the supplied signals are different and the warning signal generator 50 and the warning device shown in broken line operate.

That is, when the fill-in flash selection means 1 selects the rear light condition and the display F-stop value setting means does not operate, the warning signal generator 50 operate always.

As a result, user can recognize necessity of making the display F-stop value setting means 54 operate, since making subsequent operation basing on the general judgment reference as shown in FIG. 5 is improper because it is feared that the display F-stop value varies responding to brightness variation on account of the selecting the rear light condition as above-mentioned.

Next, an operation in case where the display F-stop value setting means 54 operates when the warning operation is executed, is described as follows.

The display F-stop value setting means 54 makes the light measuring circuit 3 operate and opens the gate 55 as above-mentioned.

Therefore, the first display F-stop value signal in the display F-stop value signal generating means 9 obtained by the operation of the light measuring circuit 3 at the time of the operation of the display F-stop value setting means 54 and by the above-mentioned processing, is supplied and memorized as the second display F-stop signal to the memory means 56 through the gate means 55.

The memory means 56 issues the memorized second display F-stop value signal to the reference setting means 57, the comparing means 49 and the automatic F-stop signal generating means 11 through the automatic F-stop value modifying means 10, thereby to control these means 57, 49, 11 and 10. Provided that the second display F-stop value signal is to display F22, the reference setting means 57 issues the second display F-stop value signal to the judgment means 53, thereby to change the judgment reference used for setting the display F-stop value from the general first judgment reference shown in FIG. 5 as mentioned above, to the second judgment reference which corresponds, for example, to the above F22 as shown in FIG. 6.

Figure 6:
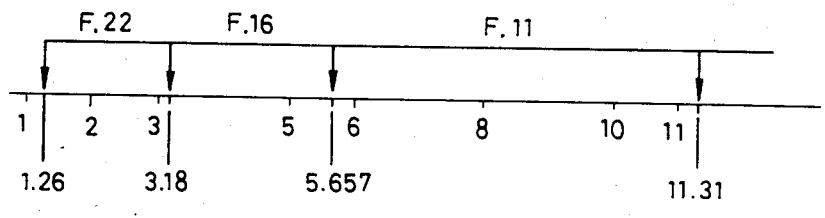
FIG. 6, FIG. 7(a) and FIG. 7(b) are charts showing a second judgement reference which is used when a display F-stop value memorized in a memory means in F22, F16 and F11.

As apparent from FIGS. 5 and 6, the judgment reference in FIG. 6 is different from the judgment reference in FIG. 5 at such point that only the measured light value range in which the display F-stop value is judged as F22, is extended to both sides of high brightness and low brightness. As a result, the display F-stop value set by the operation of the judgment means 53, does not vary responding to variation within a limited predetermined range of the object brightness after the above-mentioned operation.

Figure 7A:
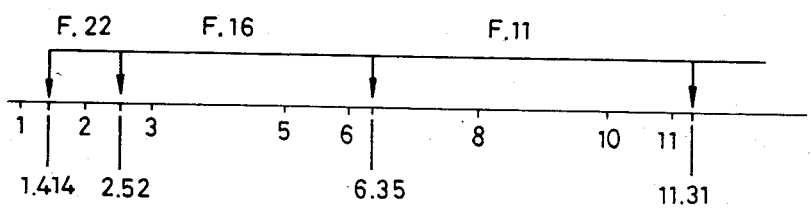
Figure 7B:
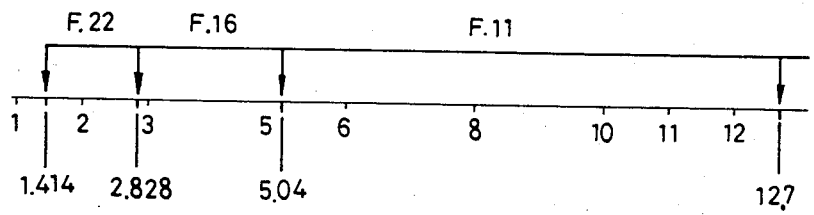

That is, once the display F-stop value setting means 54 operates, the judgment operation for the measured light value obtained by the periodical operation of the measuring circuit 3 caused by the operation of the light measuring start means 7, is executed not by the previous first judgment reference of FIG. 5, but is executed by the various second judgment references based on the contents of the memory means 56 at the operation timing of the display F-stop value setting means 54. For example, the various second judgment references are such reference as shown in FIG. 7(a) when the memorized second display F-stop value signal is corresponding to the F16, or such reference as shown in FIG. 7(b) when the memorized second display F-stop value signal is corresponding to the F11. Therefore, even for the measured light value of such value as belonging to the neighboring F-stop value, when the reference in FIG. 5 were used such a case can be produced that the display F-stop value showing the memorized F-stop value can be set. Therefore, when considering from the object brightness, the display F-stop value does not vary according to small variation of the object brightness near the brightness corresponding to the memorized F stop value.

On the contrary, when the scene brightness varies largely, for example in the above embodiment, when the reference supplied to the judgment means 53 is such reference as shown in FIG. 6 corresponding to F22 and the measured light value is 4 msec, the display F-stop value signal generating means 9 issues the first display F-stop value signal for displaying the F16. Therefore, the first display F-stop value signal and the second display F-stop value signal are different, accordingly the comparing means 49 drives the warning signal generator 50. Thus, the necessity of the operation of the next operation of the display F-stop value setting means 54, is noticed.

The embodiment of the operation of the automatic electronic flash of the present invention is described as follows.

Now, when the measured light value of the measured light value setting means 52 is fluctuating between 2.8 msec and 2.9 msec and that the display F-stop value setting means 54 does not operate, the first display F-stop value signal for displaying the F22 is issued when the measured light value is 2.8 msec and that for the F16 is issued when the measured light value is 2.9 msec, based on the first reference in FIG. 5. At the same time, a warning operation for noticing the necessity of the operation of the display F-stop value setting means 54 is executed.

When the display F-stop value setting means 54 operates and the measured light value is 2.8 msec, the first display F-stop value signal for displaying F22, is issued and memorized as the second display F-stop value signal. And also, because the comparing result becomes equal, the above-mentioned warning operation is stopped.

When the measured light value obtained by the measuring operation driven by the light measuring start means 7 is 2.9 msec, if the display F-stop value setting means 54 does not operate yet, the above-mentioned warning operation is executed. But then the first display F-stop value signal for displaying F22 as it is issued since the second judgment reference shown in FIG. 6 is selected by the operation of the display F-stop value setting means 54. Therefore the warning operation is not executed.

Thus, once the F-stop value to be set in the camera is set by user, it is unnecessary to reset the set F-stop value against the small fluctuation of the scene brightness. Therefore, the F-stop setting operation on practical photographing operation can be executed very smoothly.

The amount of the regions corresponding to each F-stop value in FIG. 6, FIGS. 7(a) and 7(b) against that of FIG. 5, is set considering the latitude etc. of the film. For example, it is confirmed that when the references at the high and low brightness sides in FIG. 5 are respectively $\pm\frac{1}{2}$ EV against the corresponding F-stop value, the references can be set within $\pm 2/3$ EV against each F-stop value in FIG. 6 and FIGS. 7(a) and 7(b), respectively.

Figure 8:
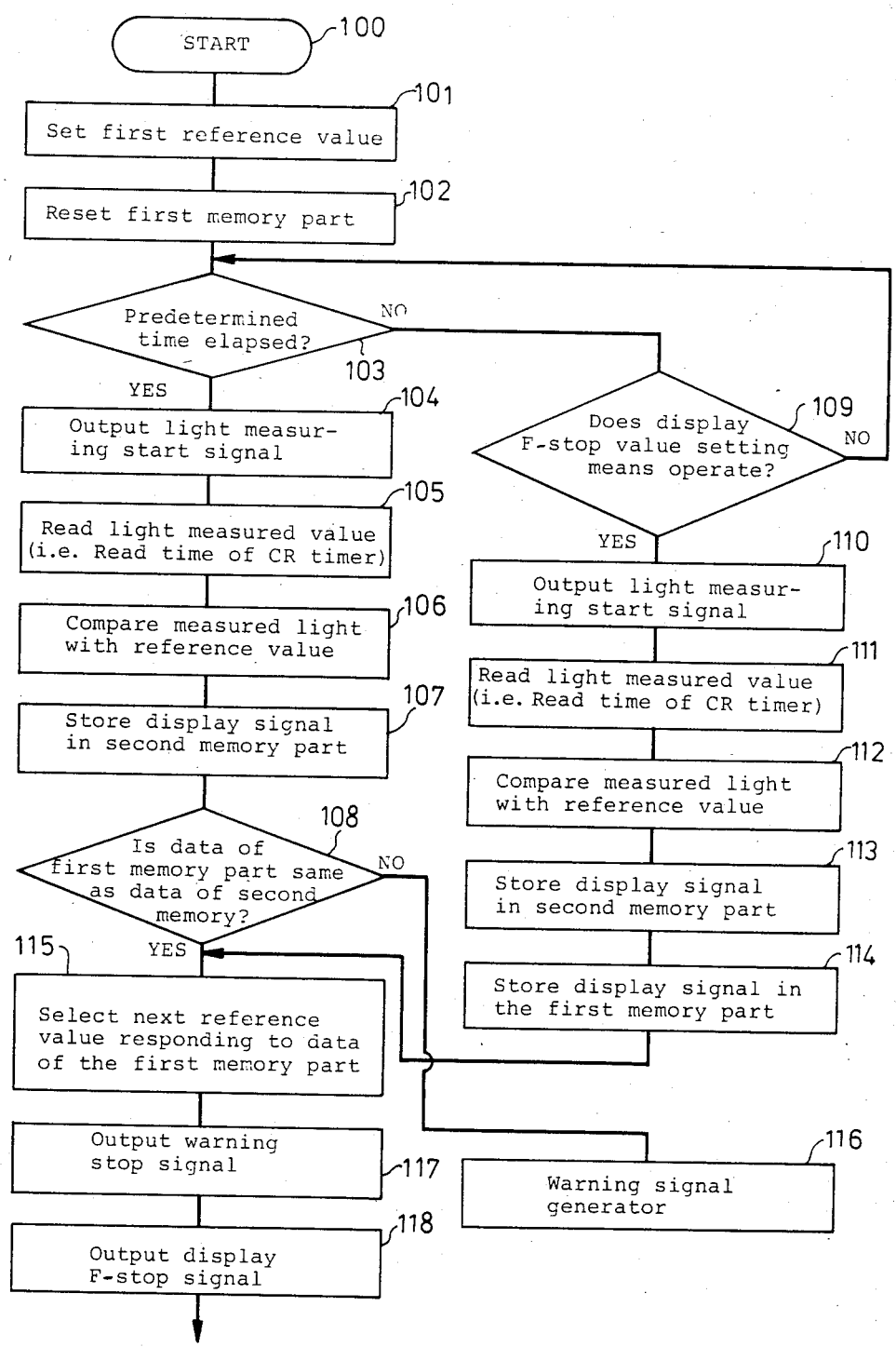
FIG. 8 is a flow chart of a micro compuitor constituting the main part of the embodiment in FIG. 4.

FIG. 8 shows an operational flow chart in case that the main part of the automatic electronic flash of the present invention described in FIG. 4 is constituted by a micro computor.

Description on the flow chart is as follows:

When the starting of the system is executed in a step 100, the judgment reference of the judgment means 53 described in FIG. 4 is set as the general first judgment reference in FIG. 5, in a step 101.

After the step 101 is completed, a first memory responding to the above memory corresponding to the above memory means 56, memorizing and holding the display F-stop value signal, is reset in a step 102.

After the step 102 is completed, the step 103 is selected, and it is judged whether the period time of the operation of the light measuring start means 7 described in FIG. 4 lapses or not.

When the period time is judged to lapse in the step 103, the system selects the step 104 and otherwise the step 109 is selected.

In a step 104, the light measuring operation for driving the light measuring circuit 3 is issued.

When the light measuring starts in step 104, the measured light signal of the light measuring circuit 3 is detected as a measured light value in step 105. The detecting operation is such an operation to read the time until the voltage of the capacitor charged by the light current flowing in the light receiving element included in the light measuring circuit 3, reaches a predetermined value.

In the step 105, the time signal as the measured light value is read, and next in a step 106 the time signal is compared with the adequate judgment reference set in the step 101 etc.

Incidentally, the adequate judgment reference is the first judgment reference, when the step 106 is selected directly by the step 100.

As a result, a display F-stop value is issued by the comparing operation in the step 106, that is, when the measured light value is 2.0 msec in the step 105 and the judgment reference is the first judgment reference shown in FIG. 5, the display F-stop value for displaying F22 is issued. Then the issued display F-stop value signal is memorized in a second memory, which memorizes only a newest supplied signal, in a next step 107.

After the step 107 is completed, the contents of the first memory and the contents of the second memory are compared in step 108, and when the contents are same a step 115 is selected, and otherwise a step 116 is selected.

When the period time is judged not to lapse in the step 103, a step 109 is selected and it is judged whether the display F-stop value setting means 54 in FIG. 4 operates or not.

When it is judged that the display F-stop value setting means 54 does not operates in the step 109, the system selects again the step 103.

When it is judged that the display F-stop value setting means 54 operates in the step 109, a step 110 is selected and the light measuring circuit 3 starts to operate similar as the step 104.

When the light measuring operation starts in the step 110, the time signal is read in a next step 111 as the above step 105.

The time signal is compared in a next step with the first judgment reference set in the step 101 as the above step 106, thereby to produce a display F-stop value signal.

The display F-stop value signal in the step 112 is memorized in a next step 113 in the second memory which memorizes only newest information and further is memorized in the above-mentioned first memory in a next step 114. After these memorizing steps are completed, a next step 115 is selected.

In the step 115, the judgment reference of the judgment means 53 in FIG. 4 is selected by the contents of the first memory. For example, the second judgment reference as shown in FIG. 6, FIGS. 7(a) and 7(b) is selected responding to the contents of the first memory.

After the step 115 is completed, a warning stopping signal for stopping the warning operation is issued.

In a step 116 which is selected when the contents of both memories are different in the step 108, the signal for driving the warning signal generator 50 described in FIG. 4 is issued.

After the step 117 or step 116 is completed, the step 118 is selected and the display F-stop value signal responding to the contents of the second memory is issued. After this, the system selects the step 103 again.

A microcomputer having the same steps as the abovementioned steps can execute the same operations as the operations of the measured light value setting means 52, the judgment means 53, the display F-stop signal generating means 9, the gate means 55, the memory means 56, the reference setting means 57 and the comparing means 49.

Though not shown in the flow chart of FIG. 8, the means other than the above-mentioned means, for example, the light measuring start means 7 can be constituted by a microcomputer when required.

As above-mentioned, the automatic electronic flash of the present invention comprises the light measuring circuit and controls the automatic F-stop value and the display F-stop value by utilizing the output of the light measuring circuit, thereby enables easy execution of the strobe operation in the rear light condition by utilizing the automatic electronic flash operation.

Further, the automatic electronic flash of the present invention can obtain the above-mentioned advantages extremely practically, by utilizing the means which can detect and warn fluctuation of the output of the light measuring circuit or occurrence of such a case that the automatic F-stop value can not be set.

Further, in the automatic electronic flash of the present invention, once the display F-stop value setting operation including the judging operation based on the general first judgment reference of the measured light value is executed, thereafter the judging operation of the measured light value until next setting operation is executed by utilizing the second judgment reference, in which only the reference level for selecting the display F-stop value set by the first judgment reference is extended to high brightness side and to low brightness side. Therefore, after the above-mentioned setting operation is once executed, the result of the judging operation does not fluctuate and no useless warning operation is executed for small scene brightness fluctuations. Therefore, the display F-stop value, once set, does not fluctuate responding to the small variation of the scene brightness, thereby enabling easy photographing operation in the rear light condition utilizing the automatic electronic flash.

What is claimed is:

1. An automatic electronic flash comprising:
   key input means for inputting photographing data such as F-stop value,
   key input reception means for outputting electric signals responding to input operation by said key input means,
   fill-in flash selection means for selecting fill-in flash photographing when a photographic scene has a rear lighting,
   display means for displaying a display F-stop value to be set on a camera to be used with automatic electronic flash,
   an automatic F-stop value setting circuit for setting an automatic F-stop value responding to an F-stop selection signal,
   a light measuring circuit for measuring brightness of scene and issuing a brightness signal responding to said measurement.
   operation mode selecting means for selecting an ordinary mode for photographing ordinarly lighted scene and a fill-in flash mode for photographing a rear-lighted scene responsive to the output of said fill-in flash selection means,
   light measuring start means for setting starting time of light measuring in said fill-in flash mode,
   measured F-stop value setting means for setting measured F-stop value, being based on said brightness signal, film sensitivity and shutter speed of said camera, to produce a measured F-stop value signal,
   display signal generating means for generating display F-stop value signal being based on said measured stop signal, in case of a rear light photographing and on said outputted electric signal of said key input reception means in case of an ordinarily lighted scee, to actuate said display means,
   automatic F-stop value modifying means for generating a first automatic F-stop value signal which modifies said measured F-stop value signal to a value lower by 1-2 EV than said display stop value signal, and
   automatic F-stop signal generating means for generating a second automatic F-stop value signal which corresponds to said first automatic F-stop value signal in said automatic F-stop value modifying means and to said outputted electric signal of said key input reception means in case of a usual photographing and sets said automatic F-stop value setting circuit.

2. An automatic electronic flash in accordance with claim 1, further comprising:
   a F-stop value memory means for memorizing said measured F-stop value signal from said measured F-stop value setting means and issuing the last memorized measured F-stop value,
   a comparing means for comparing said measured F-stop value with said last measured F-stop value, being supplied said two measured F-stop values, thereby to issue a warning signal when said two measured F-stop values are different to each other, said display F-stop signal generating means receiving said measured F-stop value through said comparing means, and said automatic F-stop value modifying means receiving said measured F-stop value through said comparing means,
   a warning signal generator for making a warning device operate according to said warning signal and for issuing a display F-stop value control signal which controls the operation of said display F-stop signal generating means.

3. An automatic electronic flash in accordance with claim 1, further comprising
   an effective range memorizing means for memorizing predeterminately an effective range in which said automatic F-stop value can be set,
   a comparing means for comparing said measured F-stop value signal with a signal from said effective range memorizing means, thereby to issue a warning signal when said measured F-stop value is out of said effective range, said display F-stop signal generating means receiving said measured F-stop value signal through said comparing means, said automatic F-stop value modifying means receiving said measured F-stop value signal through said comparing means, and
   a warning signal generator for making a warning device operate according to said warning signal and for issuing a display F-stop value control signal which controls the operation of said display F-stop signal generating means.

4. An automatic electronic flash in accordance with claim 1, 2 or 3, wherein
   said operation mode selecting means controls said key input reception means and makes said key input reception means issue a starting signal for operating said light measuring start means according to said input key means operation when said fill-in flash mode is selected.

5. An automatic electronic flash in accordance with claim 1, 2 or 3, wherein
   said operation mode selecting means issues a mode display signal which makes said display device display a mark displaying the fill-in flash mode, to said display device, when said fill-in flash mode is selected.

6. An automatic electronic flash in accordance with claim 1, wherein
   said measured F-stop value setting means comprises;
   a measured light value setting means for changing the output of said light measuring circuit to measured light value responding to said brightness, thereby set it, a judgment means for comparing usually said measured light value with general first judgment reference, thereby to select an F-stop value to be set in said camera responding to said brightness and to issue a measured F-stop value signal to said display F-stop signal generating means, a display F-stop value setting means for making said light measuring circuit operate by optional operation regardless of the operation of said light measuring start means and for making said display F-stop signal generating means issue a first display F-stop value signal at requested timing, a memory means for memorizing as a second displaying F-stop value signal, said requested timing first displaying F-stop value signal which is supplied from said display F-stop signal generating means through a gate means which is driven by only the operation of said display F-stop value setting means, a reference setting means for supplying a second judgment reference in which only the reference extent on which said requested timing first displaying F-stop value signal is set according to said first judgment reference, is extended to high brightness side and to low brightness side.

7. An automatic electronic flash in accordance with claim 6, wherein said measuring light value setting means, said judgment means, said display F-stop signal generating means, said memory means, said gate means, said reference setting means and said comparing means are constituted by a microcomputer, said micro computor having at least a 1st step for selecting said ordinary first judgment reference as a judgment reference of measured light value, a 2nd step for resetting a first memory memorizing and holding said display F-stop value, a third step for confirming the operation of said light measuring start means, a 4th step for driving said light measuring circuit, being selected at the confirmation of the operation of said light measuring start means in said 3rd step, a 5th step for obtaining a measured light value from said measured light signal issued from said light measuring circuit, a 6th step for comparing said measured light value with said selected judgment reference, thereby to make a display F-stop value signal, a 7th step for memorizing said display F-stop value signal in a second memory, a 8th step for confirming the operation of said display F-stop values setting means, being selected at the non-confirmation of said operation of said light measuring start means in said 3rd step, a 9th step for driving the operation of said light measuring circuit when the operation of said display F-stop values setting means is confirmed in the 8th step, a 10th step for obtaining a measured light value from said measured light signal obtained by the operation of the light measuring circuit, an 11th step for making a display F-stop value signal by comparing said measured light value with said selected judgment reference, a 12th step for memorizing said display F-stop value signal in said second memory, a 13th step for memorizing said display F-stop value signal in said first memory, a 14th step for confirming whether said contents of said first memory and second memory are same or not to each other, a 15th step for issuing a warning start signal, being selected when the both memory contents are not same, a 16th step for selecting said second judgment reference based on the contents of said first memory, being selected when said both memory contents are same or after said 13th step is completed, a 17th step for producing a warning stop signal, being selected after said 16th step, and a 18th step for issuing said display F-stop signal memorized in said second memory and for selecting said third step, being selected after said 17th step.

8. An automatic electronic flash in accordance with claim 6, wherein said light measuring circuit comprises a light receiving element receiving a light from said scene and a capacitor charged with a light current flowing through said light receiving element, said measured light value setting means detects a time until said charged voltage of said capacitor reaches a predetermined value and issues a time signal as a measured light signal.

* * * * *